US012742904B2

(12) United States Patent
Yang et al.

(10) Patent No.: US 12,742,904 B2
(45) Date of Patent: Sep. 22, 2026

(54) ENERGY BAND METHOD FOR PROCESSING ACOUSTIC DATA

(71) Applicant: SAUDI ARABIAN OIL COMPANY, Dhahran (SA)

(72) Inventors: Yunlai Yang, Dhahran (SA); Wei Li, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 209 days.

(21) Appl. No.: 18/698,234

(22) PCT Filed: Oct. 25, 2022

(86) PCT No.: PCT/CN2022/127201

§ 371 (c)(1),
(2) Date: Apr. 3, 2024

(87) PCT Pub. No.: WO2024/087003

PCT Pub. Date: May 2, 2024

(65) Prior Publication Data

US 2025/0231313 A1 Jul. 17, 2025

(51) Int. Cl.
*G01V 1/50* (2006.01)
*E21B 44/00* (2006.01)

(52) U.S. Cl.
CPC ................ *G01V 1/50* (2013.01); *E21B 44/00* (2013.01); *G01V 2200/16* (2013.01);
(Continued)

(58) Field of Classification Search
CPC ................ G01V 1/50; G01V 2200/16; G01V 2210/1216; G01V 2210/1429;
(Continued)

(56) References Cited

U.S. PATENT DOCUMENTS 4,888,740 A * 12/1989 Brie ......................... G01V 1/50 73/152.16
6,791,470 B1 9/2004 Drumheller
(Continued)

FOREIGN PATENT DOCUMENTS

CN 101936159 A 1/2011
CN 111364981 A 7/2020
(Continued)

OTHER PUBLICATIONS

Gao et al. ("An Analysis Method for Time-, Frequency-, and Energy-Domain Characteristics of Downhole Microseismic Signals and Its Application." Shock and Vibration Jan. 2021 (2021): 6699221., "Gao") (Year: 2021).*

(Continued)

*Primary Examiner* — Yuqing Xiao
*Assistant Examiner* — Christopher Richard Walker
(74) *Attorney, Agent, or Firm* — Osha Bergman Watanabe & Burton LLP

(57) ABSTRACT

A method that includes obtaining a first acoustic signal and transforming the first acoustic signal into a first frequency spectrum using a frequency transformer, where the first frequency spectrum comprises a first plurality of frequency data points. The method further includes partitioning the first plurality of frequency data points into a first plurality of energy bands using an energy band partitioning function. The method further includes determining a representative frequency for each of the first plurality of energy bands and determining a representative amplitude for each of the first plurality of energy bands, where the representative amplitude is determined based on an energy conservation principle. The method further includes determining a first energy band series, where the first energy band series comprises the representative amplitude and the representative frequency (Continued)

for each of the first plurality of energy bands and determining, using the first energy band series, an acoustic signal characteristic.

17 Claims, 8 Drawing Sheets

(52) U.S. Cl.
CPC ................ *G01V 2210/1216* (2013.01); *G01V 2210/1429* (2013.01); *G01V 2210/43* (2013.01); *G01V 2210/6169* (2013.01)

(58) Field of Classification Search
CPC ......... G01V 2210/43; G01V 2210/624; G01V 2210/6169; G01V 2210/6244; E21B 44/00; E21B 49/003
USPC ............................................................ 367/25
See application file for complete search history.

(56) References Cited

U.S. PATENT DOCUMENTS 7,404,456 B2 7/2008 Weaver et al.
9,234,974 B2 1/2016 Yang
9,447,681 B2 9/2016 Yang
9,684,087 B2 6/2017 Yang
9,903,974 B2 2/2018 Yang
10,519,769 B2 12/2019 Havens et al.
10,934,832 B2 3/2021 Gleitman
2013/0075159 A1 3/2013 Yang
2013/0075161 A1* 3/2013 Yang ...................... E21B 49/00 175/50
2013/0308424 A1* 11/2013 Kumar .................... G01V 1/50 367/81
2015/0159478 A1* 6/2015 Georgi ................... E21B 7/046 367/83
2017/0328199 A1 11/2017 Marsh
2020/0109618 A1* 4/2020 Flanagan ................. E21B 7/10
2021/0372258 A1 12/2021 Kazemi Nojadeh et al.
2021/0389492 A1 12/2021 Yang et al.

FOREIGN PATENT DOCUMENTS

CN 114492521 A 5/2022
WO 2013049111 A2 4/2013

OTHER PUBLICATIONS

International Search Report and Written Opinion of the International Searching Authority issued in corresponding International Application No. PCT/CN2022/127201, mailed Jul. 24, 2023 (9 pages).

* cited by examiner

FIG. 7

ENERGY BAND METHOD FOR PROCESSING ACOUSTIC DATA

BACKGROUND

Acoustic signals may be processed and analyzed in order to extract useful information. For example, acoustic signals recorded using probes attached to machinery may be analyzed to determine whether a machine is operating as expected or if a component failure has occurred or is imminent. However, to properly analyze a signal, an acoustic signal often needs to undergo pre-processing or processing steps. Pre-processing may include various forms of signal denoising, data reduction, and/or subsampling. Likewise, processing may include applying a Fourier transform to an acoustic signal to transform the signal to the frequency domain.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One or more embodiments disclosed herein generally relate to a method that includes obtaining a first acoustic signal and transforming the first acoustic signal into a first frequency spectrum using, in part, a frequency transformer, where the first frequency spectrum comprises a first plurality of frequency data points. The method further includes partitioning the first plurality of frequency data points into a first plurality of energy bands using an energy band partitioning function, wherein the energy band partitioning function determines the first plurality of energy bands based on a predetermined energy band criteria. The method further includes determining a representative frequency for each of the first plurality of energy bands and determining a representative amplitude for each of the first plurality of energy bands, where the representative amplitude is determined based on an energy conservation principle and the representative frequency. The method further includes determining a first energy band series, wherein the first energy band series comprises the representative amplitude and the representative frequency for each of the first plurality of energy bands and determining, using the first energy band series, an acoustic signal characteristic.

One or more embodiments disclosed herein generally relate to a non-transitory computer readable medium, storing instructions executable by a computer processor. The instructions include functionality for receiving a first acoustic signal and transforming the first acoustic signal into a first frequency spectrum using, in part, a frequency transformer, where the first frequency spectrum comprises a first plurality of frequency data points. The instructions further include functionality for partitioning the first plurality of frequency data points into a first plurality of energy bands using an energy band partitioning function, wherein the energy band partitioning function determines the first plurality of energy bands based on a predetermined energy band criteria. The instructions further include functionality for determining a representative frequency for each of the first plurality of energy bands and determining a representative amplitude for each of the first plurality of energy bands, where the representative amplitude is determined based on an energy conservation principle and the representative frequency. The instructions further include functionality for determining a first energy band series, where the first energy band series comprises the representative amplitude and the representative frequency for each of the first plurality of energy bands and determining, using the first energy band series, an acoustic signal characteristic.

One or more embodiments disclosed herein generally relate to a system that includes a drilling system, an acoustic signal recording system, and a computer. The drilling system includes a drill bit configured to cut a rock, and an operations system configured to monitor and control drilling operations, the operations system configured to measure and record, at least, a rotation speed of the drill bit and a depth of the drill bit. The acoustic signal recording system is configured to receive and record an acoustic signal and includes an acoustic sensor, a receiver, and a data acquisition unit. The computer includes one or more processors and a non-transitory computer readable medium storing instructions executable by the one or more computer processors. The instructions include functionality for transforming the acoustic signal into a frequency spectrum using, in part, a frequency transformer, where the frequency spectrum comprises a plurality of frequency data points and partitioning the plurality of frequency data points into a plurality of energy bands using an energy band partitioning function, where the energy band partitioning function selects the plurality of energy bands based on a predetermined energy band criteria. The instructions further include functionality for determining a representative frequency for each of the plurality of energy bands and determining a representative amplitude for each of the plurality of energy bands, where the representative amplitude is determined based on an energy conservation principle and the representative frequency. The instructions further include functionality for determining an energy band series, where the energy band series comprises the representative amplitude and the representative frequency for each for each of the plurality of energy bands and determining, using the energy band series, an acoustic signal characteristic.

Other aspects and advantages of the claimed subject matter will be apparent from the following description and the appended claims.

BRIEF DESCRIPTION OF DRAWINGS

FIG. 7 depicts a flowchart in accordance with one or more embodiments.

DETAILED DESCRIPTION

Figure 1:
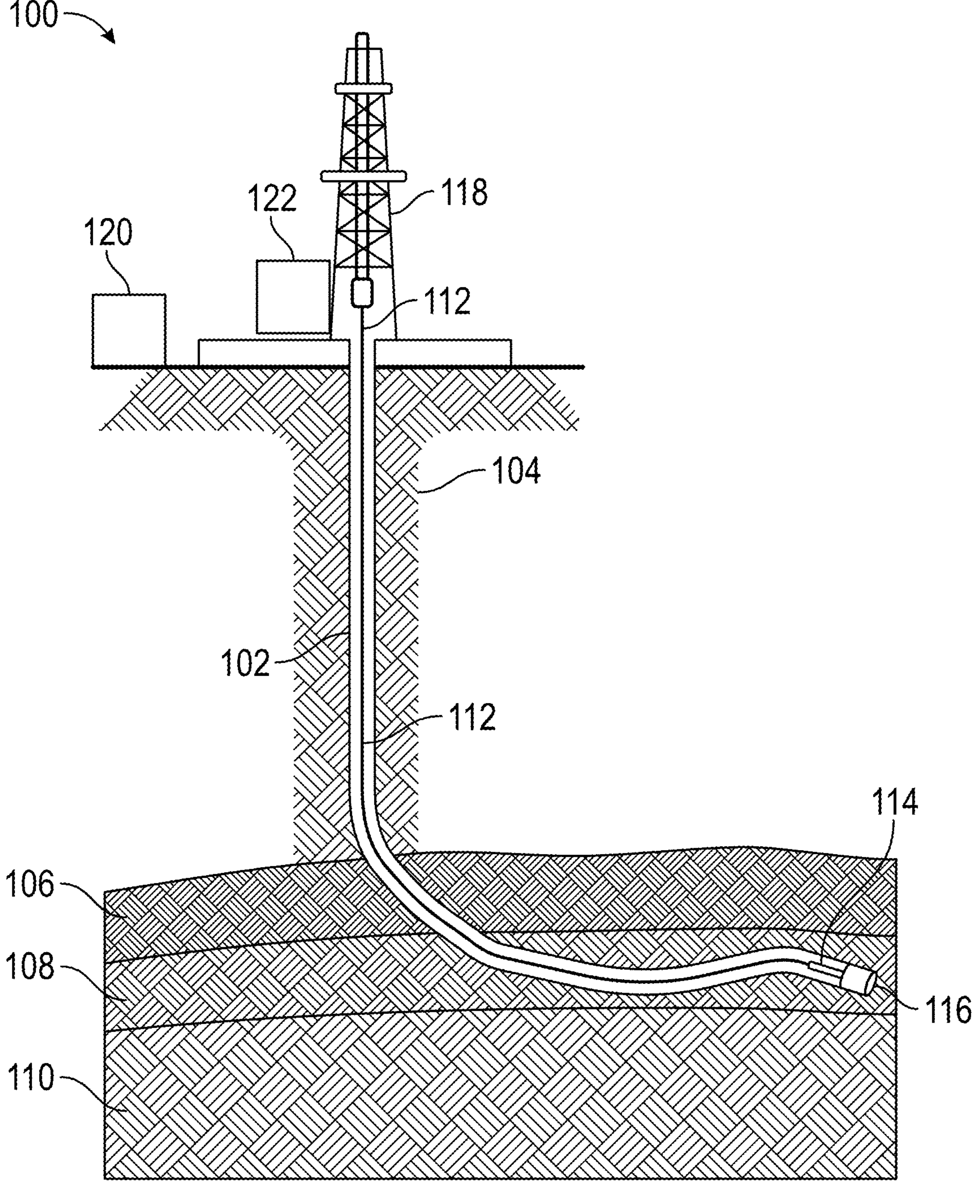
FIG. 1 depicts an example drilling rig, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

FIG. 1 illustrates an example drilling rig (100). A drilling rig (100) may be used to extract oil and gas, generally referred to as hydrocarbons, from underground reservoirs. In general, well sites may be configured in a myriad of ways. Therefore, drilling rig (100) is not intended to be limiting with respect to the particular configuration of the drilling equipment. The drilling rig (100) is depicted as being on land. In other examples, the drilling rig (100) may be offshore, and drilling may be carried out with or without use of a marine riser. A drilling operation at drilling rig (100) may include drilling a wellbore (102) into a subsurface including various formations (104, 106, 108, 110). The subsurface formations (104, 106, 108, 110) may be categorized by various formation properties of interest, such as formation porosity, formation permeability, resistivity, density, water saturation, total organic carbon content and the like. Based on its properties, a subsurface formation (104, 106, 108, 110) may be categorized according to a lithology, such as sandstone or shale. Further, the wellbore (102) may be directed toward a target zone of the subsurface, such as a reservoir (108).

For the purpose of drilling a new section of wellbore (102), a drill string (112) is suspended within the wellbore (102). The drill string (112) may include one or more drill pipes connected to form conduit and a bottom hole assembly (BHA) (114) disposed at the distal end of the conduit. The BHA (114) may include a drill bit (116) to cut into the subsurface rock. The BHA (114) may include measurement tools, such as a measurement-while-drilling (MWD) tool and logging-while-drilling (LWD) tool. Measurement tools may include sensors and hardware to measure downhole drilling parameters, and these measurements may be transmitted to the surface using any suitable telemetry system known in the art. The BHA (114) and the drill string (112) may include other drilling tools known in the art but not specifically shown.

The drill string (112) may be suspended in a wellbore (102) by a derrick (118). A crown block may be mounted at the top of the derrick (118), and a traveling block may hang down from the crown block by means of a cable or drilling line. One end of the cable may be connected to a draw works, which is a reeling device that may be used to adjust the length of the cable so that the traveling block may move up or down the derrick (118). The traveling block may include a hook on which a top drive is supported.

The top drive is coupled to the top of the drill string (112) and is operable to rotate the drill string (112). Alternatively, the drill string (112) may be rotated by means of a rotary table on the drilling floor. Drilling fluid (commonly called mud) may be stored in a mud pit (not shown), and at least one pump may pump the mud from the mud pit into the drill string (112). The mud may flow into the drill string (112) through appropriate flow paths in the top drive (or a rotary swivel if a rotary table is used instead of a top drive to rotate the drill string (112)).

In one implementation, an operations system (120) may be disposed at or communicate with the drilling rig (100). Operations system (120) may be configured to monitor and control at least a portion of a drilling operation at the drilling rig (100) by providing controls to various components of the drilling operation. In one or more embodiments, the operations system (120) may receive data from one or more sensors arranged to measure controllable parameters of the drilling operation. As a nonlimiting example, sensors may be arranged to measure WOB (weight on bit), RPM (drill string rotational speed), GPM (flow rate of the mud pumps), ROP (rate of penetration of the drilling operation), and an acoustic signal emanating from the drill bit (116). The operations system (120) may further include a geosteering system. The geosteering system guides the direction of the drill bit (116). Generally, the goal of the geosteering system is to steer, horizontally and laterally, the drill bit (116) through the "pay zone" (i.e., the high production zone of a reservoir (108)) in real-time.

While drilling, drill sound is generated by the drill bit cutting the rock. The drill sound is a type of acoustic signals emanating from the drill bit (116). The acoustic signals generated while drilling are affected by the lithology of the rock contacted by the drill bit (116) and other operational parameters of the drilling system (e.g., rotational speed of the drill bit (116)). In accordance with one or more embodiments, the acoustic signals may be collected by a plurality of acoustic sensors. Generally, acoustic sensors are attached to the drive shaft of a drilling rig (100). In some embodiments, the acoustic sensors may be attached to the drive shaft directly. In some embodiments, the acoustic sensors may be attached to the drive shaft through an interface such as a bearing. In drilling operation, the acoustic signals emanating from the drill bit transmits upwards along the drill string and then are picked up by the acoustic sensors. The acoustic signals picked up by the acoustic sensors may be transmitted through an electronic wire or wirelessly through a receiver to a data acquisition unit. Because acoustic signals emanating from the drill bit (116) while drilling are affected by the properties of the contacted subsurface formation and drilling operational parameters, the acoustic signals may be said to contain information describing, at least, the subsurface rock formation. Consequently, acoustic signals, upon processing and analysis may aid the geosteering system in guiding and maintaining the drill bit (116) in the highest production zones of the reservoir (108). For example, after proper processing and analysis, acoustic signals may be used for lithology identification.

In one aspect, embodiments disclosed herein relate to a method of processing one or more acoustic signals. As will be shown, acoustic signal processing techniques disclosed herein serve to simplify and denoise the frequency spectrum of an acoustic signal via a specialized partitioning function and energy-based frequency aggregation. The processed acoustic signal easily lends itself to further analysis such as lithology identification and geosteering.

In accordance with one or more embodiments, an acoustic signal is received by an acoustic signal recording system (122). The acoustic signal recording system (122) includes at least one acoustic sensor, a receiver, a data acquisition unit, and a computer. In one or more embodiments, the at least one acoustic sensor is fixedly attached to the drill string (112), or one or more mechanisms used to drive the drill string (112) (e.g., a drive shaft). The at least one acoustic sensor picks up the acoustic signals transmitting from the drill bit to the at least one acoustic sensor through the drill string. The acoustic signals picked up by the at least one acoustic sensor may be transmitted through an electronic wire or wirelessly through the receiver to the data acquisition unit. The data acquisition unit processes and digitizes the acoustic signals. The digitized acoustic signals are transmitted to the computer to be recorded and are processed by using a program installed on the computer. Generally, an acoustic signal represents the amplitude of vibration or sound with respect to time. In the case where an acoustic signal is recorded digitally, the acoustic signal may be represented as a time-series, where signal amplitudes are recorded at discrete sample times. If the sample times are uniformly spaced in time (i.e., an equal amount of time passes between each sampled value), then the time-series may further be described by a sampling rate. It should be stated that in practical settings, uncertainty surrounding the sampled amplitudes in a time-series is to be expected. This uncertainty may originate in the analog-to-digital conversion, where a received signal is converted to a discrete value. Additionally, uncertainty may stem from noise or random perturbations in the underlying signal or through the reception of additional acoustic signals (e.g., noises in the surrounding environment).

It is well known in the art that a time-series may be transformed from the time-domain to the frequency-domain through application of a Fourier transform. To provide context for the advantages of the embodiments disclosed herein, a brief description of the Fourier transform is provided. However, one with ordinary skill in the art will recognize that various conventions and implementations for the Fourier transform exist such that any description provided herein should not be considered limiting. Consider a function which describes the amplitude of a signal at a given time, f(t). Generally, the Fourier transform of f(t) may be written as $$\hat{f}(\omega) = \int_{-\infty}^{\infty} f(t) e^{-i2\pi\omega t} dt, \tag{1}$$

where i indicates an imaginary number and ω represents a frequency. The result of the Fourier transform, as given in EQ. 1, is a function $\hat{f}(\omega)$. The function $\hat{f}(\omega)$ produces a complex number for any given frequency ω. A complex number may be fully defined using a phase and an amplitude. To distinguish the amplitude of the complex number returned by the Fourier transform from the amplitude of an acoustic signal, the terms frequency phase and frequency amplitude will be used herein. For real signals, signals where f(t) contains no imaginary component, $\hat{f}(\omega)$ and $\hat{f}(-\omega)$ are complex conjugates. Consequently, $\hat{f}(\omega)$ is often depicted using a frequency phase, frequency amplitude, or both at a given positive frequency ω.

While EQ. 1 is the mathematical definition of the Fourier transform, and it may be applied to a variety of temporal (e.g., f(t)) or spatial functions, in many practical settings it must be altered to be implemented using a computer on finite and sampled signals. For example, in the case of an acoustic signal, the acoustic signal may not be defined for all time (the limits of integration in EQ. 1 are −∞ to +∞). Further, as previously mentioned, oftentimes an acoustic signal is recorded as a discrete time series. In combination, the finite time series representation of an acoustic signal may be thought of as a windowed and sampled version of a continuous time-varying function (such as f(t)) describing a sound. Consider, for example, a time series x as an ordered array of amplitude values (e.g., the amplitude of a sound wave). The time series x may be composed of N elements ($x=[x_0, x_1, \ldots, x_n, \ldots, x_{N-2}, x_{N-1}]$), where each element holds an amplitude value and is associated with a given time. If an acoustic signal is sampled uniformly, the temporal spacing between elements in the time series representation of the acoustic signal may be given by Δ, where $\Delta=1/f_s$ and $f_s$ is the sampling rate. Therefore, the time associated with an element $x_n$ may be expressed as $t=n\Delta$. With these definitions in hand, a common implementation of the Fourier transform on finite and discrete signals (i.e., a time series) is given by $$X(\omega_k) = \sum_{n=0}^{N-1} x_n e^{-i2\pi\omega_k n\Delta} \Delta. \tag{2}$$

In EQ. 2, $X(\omega_k)$ is a complex number. As before, the complex number $X(\omega_k)$ may be represented in terms of frequency amplitude and frequency phase. Typically, EQ. 2 is evaluated over a series of discrete frequencies $\omega_k$, where $\omega_k = kf_s/N$. When evaluated over these frequencies, the output of EQ. 2 is a discrete series of complex numbers, hereafter referred to as X. A series X may be fully represented by plotting the frequency amplitude and frequency phase of each of its elements with respect to frequency. In many practical applications only the frequency amplitude of the elements of X are considered relevant. For concision, the series of frequency amplitudes, and associated frequencies, of a complex-valued series X is hereafter referred to as a "frequency spectrum." In summary, a time series representation of an acoustic signal may be transformed to a complex-valued series X according to EQ. 2. A reduced representation of a complex-valued series, which only takes into account the frequency amplitude of each element in the series, is called a frequency spectrum. As such, using EQ. 2, one may transform a time series representation of an acoustic signal to a frequency spectrum.

One of ordinary skill in the art will appreciate that EQ. 2 may be executed using a computer and that there are many ways to program, or algorithmically implement, EQ. 2. Often, computer implementations of EQ. 2 are optimized for speed and efficient memory management. For brevity, the details of such computer implementations are not described herein, however, it is noted that such optimized implementations are generally referred to in the literature as fast Fourier transforms. Embodiments disclosed herein are not limited to using a Fourier transform as depicted in EQ. 2 but may use any implementation of the Fourier transform including a fast Fourier transform. It is emphasized that the above description of a Fourier transform is produced only to provide requisite context for the instant disclosure and is not considered limiting in any way. Further, one with ordinary skill in the art will recognize that other methods exist to determine a frequency spectrum from a time-series. Embodiments disclosed herein generally operate on a frequency spectrum such that any method to determine a frequency spectrum known in the art may be employed without departing from the scope of this disclosure. As such, a method to transform a time series to a frequency spectrum will be hereafter referred to as a frequency transformer.

Figure 2A:
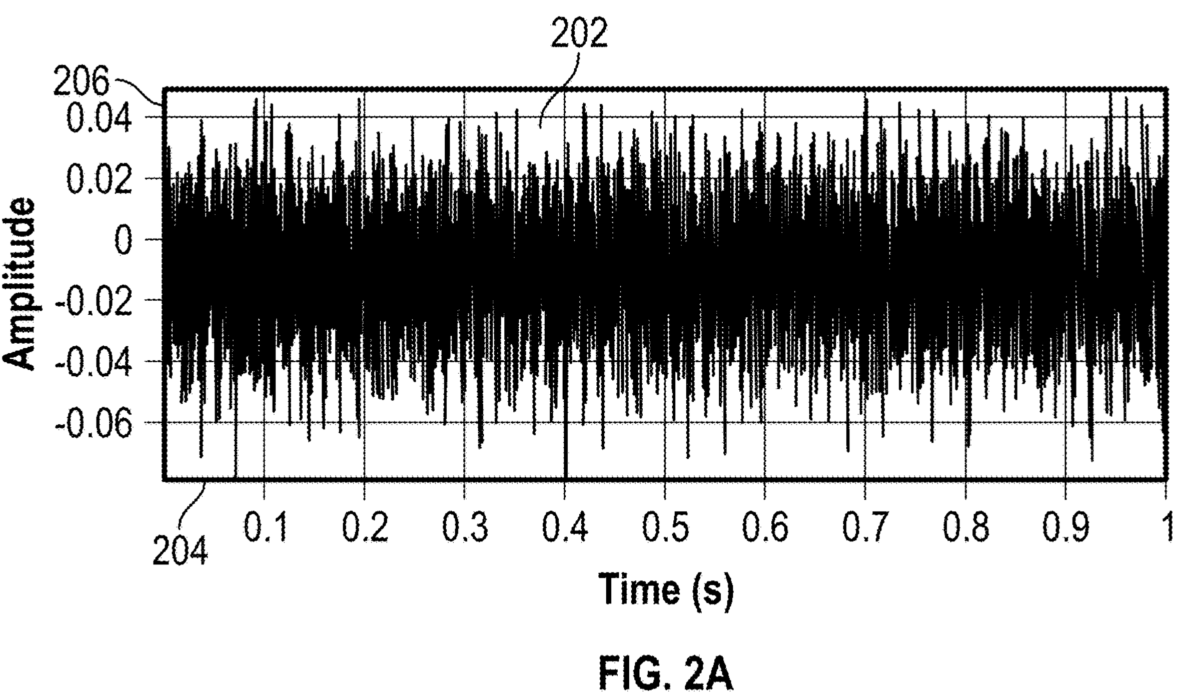
FIG. 2A depicts an acoustic signal, in accordance with one or more embodiments.
Figure 2B:
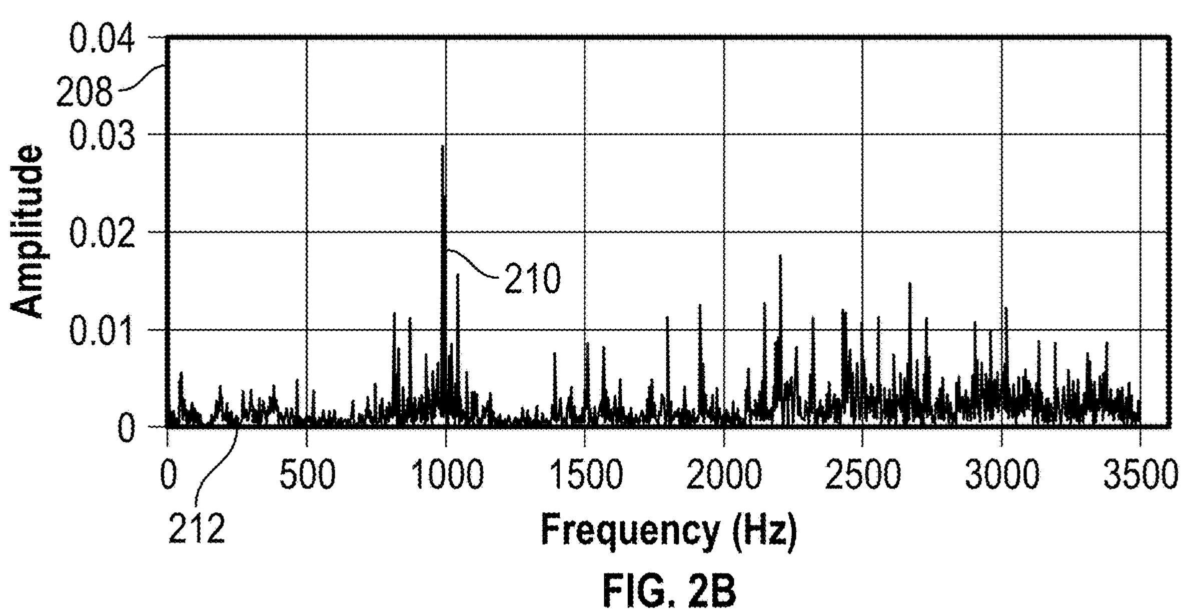
FIG. 2B depicts a frequency spectrum, in accordance with one or more embodiments.
Figures 2C, 3A, 3B:
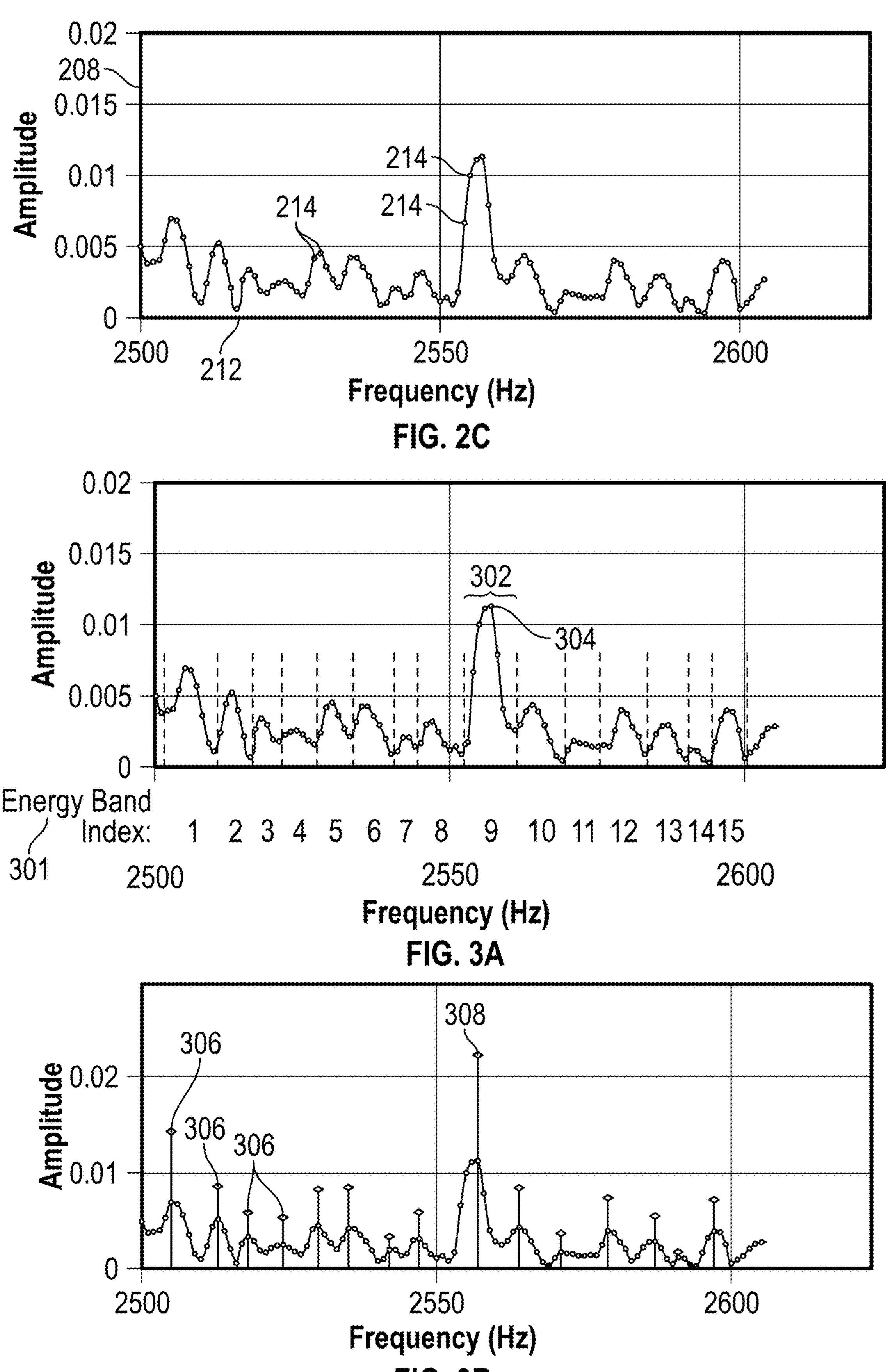
FIG. 2C depicts a portion of the frequency spectrum of FIG. 2B.
FIG. 3A depicts energy bands resulting from an energy band partitioning function, in accordance with one or more embodiments.
FIG. 3B is a graphical depiction of an energy band series, in accordance with one or more embodiments.

Turning to FIG. 2A, FIG. 2A depicts an example acoustic signal (202) recorded over a period of time from a drill bit (116), where the example acoustic signal (202) was received and recorded using an acoustic signal recording system (122). In FIG. 2A, the vertical axis (206) indicates the amplitude of the example acoustic signal (202) and the horizontal axis (204) represents time. FIG. 2B depicts the frequency spectrum (210) of the example acoustic signal (202) of FIG. 2A after application of a frequency transformer. In one or more embodiments, the frequency transformer uses, at least in part, the fast Fourier transform. As seen, the vertical axis (208) indicates frequency amplitude and the horizontal axis (212) of FIG. 2B indicates frequency. FIG. 2C depicts a portion of the frequency spectrum (210) of FIG. 2B. Specifically, FIG. 2C shows the frequency range of 2500 Hz to 2650 Hz. The choice to highlight this frequency range for FIG. 2C is arbitrary and is done simply to show greater details in the frequency spectrum. As seen in FIG. 2C, the frequency spectrum (210) is composed of a plurality of frequency data points (214). For clarity, in FIG. 2C a line does not extend from the label 214 to every frequency datum. Additionally, for clarity, a trend line is drawn between the frequency data points (214) in FIG. 2C.

As previously described, uncertainty may exist within the recorded acoustic signal or time series. The uncertainty may originate from a variety of sources. As a non-limiting example, the digitization of an acoustic signal and/or random perturbations may introduce error into the time series representation of an acoustic signal. This uncertainty is not mitigated a frequency transformer (e.g., Fourier transform), but rather uncertainty within an acoustic signal is propagated to the frequency spectrum. Additionally, as frequently occurs in many practical situations, a recorded acoustic signal is both sampled and finite (i.e., a time series). EQ. 2 may be used to apply the Fourier transform to sampled and finite signals, however, this process is known to introduce additional errors into the resulting frequency spectrum. For example, if the sampling rate is not at least two times greater than the largest frequency contained within the signal, aliasing will occur in the frequency spectrum. Regardless of the source of the error and/or uncertainty in the frequency spectrum, the error and/or uncertainty should be reduced in order to extract useful and meaningful information from the acoustic signal when analyzing its frequency spectrum. Embodiments disclosed herein generally describe a method for aggregating consecutive groups of frequency data points into a single data point with a representative frequency amplitude at a representative frequency. The resulting frequency spectrum is simplified (i.e., contains fewer frequency data points) compared to the frequency spectrum before aggregation but has reduced uncertainty and/or error.

In accordance with one or more embodiments, an acoustic signal is received and recorded by an acoustic signal recording system (122). For example, the acoustic signals generated by the drill bit (116) while drilling may be sensed by one or more acoustic sensors fixedly attached to the drive shaft of the drilling rig (100) and the acoustic signals picked up by the one or more acoustic sensors are transmitted to a data acquisition unit. The data acquisition unit digitizes the acoustic signals and the digitized acoustic signals are transmitted to a computer to be recorded and processed. The acoustic signal is transformed to a frequency spectrum using a frequency transformer such as the Fourier transform (e.g., a fast Fourier transform). For clarity, the frequency spectrum is said to be composed of frequency data points, where each frequency data point is described by a frequency and a frequency amplitude. To denoise and simplify the frequency spectrum, groups of contiguous frequency data points are aggregated according to an energy-based function. However, before aggregation can occur, the groups of contiguous frequency data points must be defined. Herein, an identified group of contiguous frequency data points is called an "energy band." In accordance with one or more embodiments, frequency data points are partitioned into a plurality of energy bands according to an energy band partitioning function. The energy band partitioning function evaluates the frequency data points and identifies boundaries for the plurality of energy bands.

In accordance with one or more embodiments, the energy band partitioning function enforces the following set of rules to identify a plurality of energy bands and their respective boundaries. An energy band must contain a peak frequency data point, where a peak frequency data point has a higher frequency amplitude than its two neighboring frequency data points; one on each side. In the case where a frequency data point is an "edge" point (i.e., the first or last data point in the frequency spectrum series), then it may be identified as a peak frequency data point if its frequency amplitude is larger than its single neighbor's frequency amplitude. An energy band is separated from an adjacent energy band by a boundary at the frequency where a frequency data point has the lowest frequency amplitude between the energy bands. A user may prescribe which of any two adjacent energy bands to which the frequency data point with the lowest frequency amplitude belongs. For example, the frequency data point with the lowest frequency amplitude between two adjacent energy bands may always be assigned to the energy band "on the left" (i.e., the energy band bounding relatively lower frequencies). Additionally, to qualify as a valid energy band, the peak data point in an energy band must have at least m frequency data points around it, where m is a non-negative integer number defined by the user. In other words, an energy band must encompass a minimum number of frequency data points. Further, an energy band may not contain any frequency data points with a frequency amplitude equal to zero. That is, frequency data points with a frequency amplitude of zero automatically form energy band boundaries. For example, consider two potential energy bands separated by one or more contiguous frequency data points with frequency amplitudes of zero. The two potential energy bands may be designated as "left" and "right," based on their respective frequency ranges, without undue ambiguity. In this example, the frequency data point with non-zero frequency amplitude to the left (lower frequency) of the one or more frequency data points with a frequency amplitude of zero would be the last (or rightmost) frequency data point considered in the left potential energy band. Likewise, the frequency data point with non-zero frequency amplitude to the right (higher frequency) of the one or more frequency data points with a frequency amplitude of zero would be the first (or leftmost) frequency data point considered in the right potential energy band. Finally, collections of frequency data points that fail to form, or fall within, a valid energy band according to the aforementioned rules are removed from consideration for subsequent analysis.

Once the plurality of energy bands has been established, in accordance with one or more embodiments, frequency data points within each of the plurality of energy bands are aggregated. Frequency data points within an energy band are aggregated to form a single frequency data point known as a representative data point. A representative data point is positioned within its frequency band and has a frequency amplitude such that it possesses the same energy as the sum of the frequency data points within the energy band. To be concrete, consider frequency data points that have been partitioned into K energy bands, according to the energy band partitioning function describe above. The K energy bands may be indexed by k such that the energy bands returned by the energy band partitioning function are labelled 1, 2, . . . , k, . . . K. Each energy band possesses a set of frequency data points. The set of data points belonging to an energy band k may be defined as $\{DP\}_k$. Under this notation, the energy of an energy band may be calculated as $$\text{Energy}_k = \sum_{j \in \{DP\}_k} \omega_j^2 A_j^2, \tag{3}$$

where $\text{Energy}_k$ is the energy of the $k^{th}$ energy band, and $\omega_j$ and $A_j$ are the frequency and frequency amplitude of a frequency data point j. The frequency data point j is an element of the set of frequency data points $\{DP\}_k$, corresponding to the $k^{th}$ energy band.

The frequency amplitude of a representative data point of an energy band is calculated as $$RFA_k = \left[\frac{\text{Energy}_k}{(RF_k)^2}\right]^{0.5} = \frac{\left(\sum_{j \in \{DP\}_k} \omega_j^2 A_j^2\right)^{0.5}}{RF_k}, \tag{4}$$

where $RFA_k$ is the representative frequency amplitude of the $k^{th}$ energy band, positioned at the representative frequency of that energy band, or $RF_k$. As seen in EQ. 4, to calculate the representative frequency amplitude of an energy band, the representative frequency of that energy band must be known. In accordance with one or more embodiments, $RF_k$ is determined by selecting the median frequency when considering the frequencies of the frequency data points in the $k^{th}$ energy band. In other embodiments, $RF_k$ is determined by selecting the frequency corresponding to the frequency data point with the largest frequency amplitude of the frequency data points in the set $\{DP\}_k$. Without limitation, other methods to determine a representative frequency for a given energy band may be applied, so long as the selected representative frequency is a frequency bounded by the given energy band.

Upon identifying representative frequencies for each energy band, EQ. 4 may be applied to determine the representative frequency amplitude for each energy band. The result is representative data points, one for each energy band, where each individual representative data point is positioned at the representative frequency of its corresponding energy band and has a frequency amplitude equal to the representative frequency amplitude of its corresponding energy band. The collection of representative data points is referred to as an energy band series. In summary, though application of the energy band partitioning function, identification of representative frequencies, and determination of representative frequency amplitudes, a frequency spectrum may be converted to an energy band series which is simpler and less influenced by uncertainty, error, and noise.

It is emphasized that the embodiments disclosed herein for transforming a frequency spectrum to an energy band series are fully distinct from classical downsampling procedures or other aggregation methods. For example, downsampling typically cycles through a set of data points and only retains a smaller portion of them. Likewise, while other aggregation methods, such as taking the average of groups of frequency data points, may combine and reduce the number of frequency data points, these methods do not maintain a conservation of energy across the frequency spectrum. Further, these methods combine data points in a predetermined data spacing, such as equal data spacing which is most commonly used. Whereas the embodiments disclosed herein aggregates data points within intervals (energy bands) which are formed by naturally grouping the data points based on their distribution pattern. Embodiments disclosed herein produce an energy band series, which is a simplified and denoised version of a given frequency spectrum, where the energy band series is formed by naturally grouping the frequency spectrum into intervals (energy bands) and has the same energy as the original frequency spectrum. In summary, the energy band series is derived by grouping the data points of an original frequency spectrum into natural intervals (energy bands), and the amplitude of each energy band is determined according to the energy conservation principle.

As a concrete example, FIG. 3A depicts the resulting energy bands when the aforementioned energy band partitioning function is applied to the portion of the frequency spectrum shown in FIG. 2C. In this example, the energy band partitioning function identified 15 energy bands. In FIG. 3A, the boundaries of the energy bands are illustrated with dashed vertical lines. Further, for clarity, each energy band has been labelled with an index number (see Energy Band Index (301)). Segment 302 spans the energy band with an index of 9. As described above, in order to apply EQ. 4 and determine a representative frequency amplitude for each of the 15 identified energy bands, a representative frequency must be selected for each energy band. For this example, the representative frequency of an energy band was the frequency of the frequency data point with the largest frequency amplitude within the energy band. For the energy band with an index of 9, shown in FIG. 3A, the frequency data point with the largest frequency amplitude within this energy band is annotated with the label 304.

FIG. 3B depicts the representative data points (306) determined using EQ. 4. As seen, there are 15 representative data points (306), one for each of the identified energy bands. For clarity, a line from the label 306 is only directed toward the first four representative data points. The representative data point corresponding to the energy band with an index of 9 is shown with the label 308. The collection of representative data points (306) is an energy band series. The energy band series depicted in FIG. 3B is simpler (i.e., more sparse; fewer frequency data points) than the original frequency spectrum.

Returning to the case of recording an acoustic signal generated by a drill bit (116) while drilling, the depth of the drill bit (116) may be tracked as the drill bit (116) traverses through the subsurface formations (104, 106, 108, 110). The acoustic signals generated while drilling are affected by the lithology of the rock contacted by the drill bit (116) and other operational parameters of the drilling system (e.g., rotational speed of the drill bit (116)). An acoustic signal, received and recorded in real-time, may be transformed to a frequency spectrum and, in accordance with one or more embodiments, further transformed to an energy band series. The energy band series may be analyzed, in real-time, to determine petrophysical properties of the rock encountered by the drill bit (116) at the current depth of the drill bit (116). As such, analysis of acoustic signals generated by the drill bit (116) allow for real-time lithology identification as the drill bit (116) progresses through the subsurface which may aid and guide geosteering operations.

Additional advantages of embodiments disclosed herein become apparent when more than one acoustic signal is evaluated as an energy band series. For example, acoustic signals received and recorded by an acoustic signal recording system (122) from a drill bit (116) traversing the subsurface of the Earth each have an associated drill bit (116) depth. Acoustic signals received and recorded in this fashion may be considered "ordered." For example, a first acoustic signal may be received and recorded when the drill bit (116) is at a depth of 3000 feet and a second acoustic signal may be received and recorded when the drill bit (116) is at a depth of 3001 feet such that the second acoustic signal may be said to be ordered after the first acoustic signal.

Figure 4:
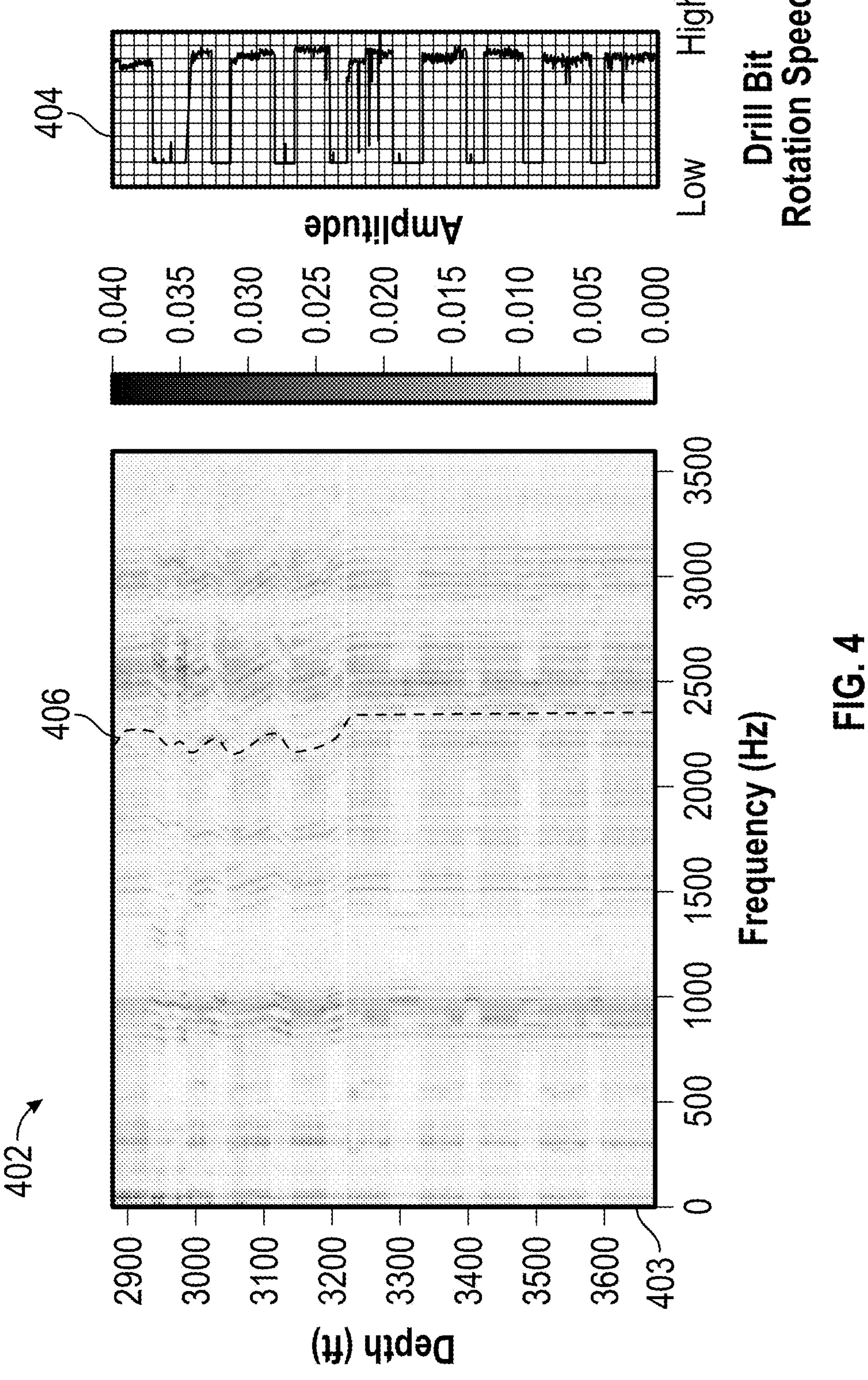
FIG. 4 depicts a plurality of frequency spectrums according to depth, in accordance with one or more embodiments.

Upon collecting a plurality of acoustic signals generated by a drill bit (116) while drilling, each acoustic signal may be converted to a frequency spectrum with an associated depth. FIG. 4 depicts a plurality of frequency spectrums (402) according to depth (403). As expected, FIG. 4 demonstrates that the frequency spectrum changes as a function of depth (403), indicative of the drill bit (116) encountering subsurface formations (104, 106, 108, 110) with varying properties and/or the drill bit (116) being subject to different environmental or operational parameters. In this case, the operational parameter of drill bit rotation speed (404) was recorded simultaneously by the operations system (120). As seen, the drill bit rotation speed (404) varied as the drill bit (116) progressed through the subsurface. To better predict the lithology (or other rock properties) using the frequency spectrum of an acquired acoustic signal while drilling, the relative affects and contributions of drill bit rotation speed and lithology on the frequency spectrum must be understood. To do so, the change in the frequency spectrum with depth (403) (or time) must be analyzed in conjunction with drill bit rotation speed (404) and lithology estimates. The change in frequency spectrum with depth can be quantified by tracking the shifts in frequency with respect to depth with one or more so-called "signal traces." An example signal trace (406) is shown with a dashed line in FIG. 4. The example signal trace (406) demonstrates relative shifts in frequency with depth. A plurality of signal traces may be determined using a plurality of ordered frequency spectrums.

While one or more signal traces are useful in analyzing a plurality of ordered frequency spectrums, because each individual frequency spectrum is sensitive to noise, uncertainty, and error, the one or more signal traces based on a plurality of such frequency spectrums will likewise suffer from noise, error, and uncertainty. Signal traces may be improved by first processing each frequency spectrum in a plurality of ordered frequency spectrums with the methods disclosed herein to transform each frequency spectrum into an energy band series. That is, noise, error, and uncertainty may be reduced, or even removed, from signal traces based on an ordered plurality of energy band series.

Figure 5A:
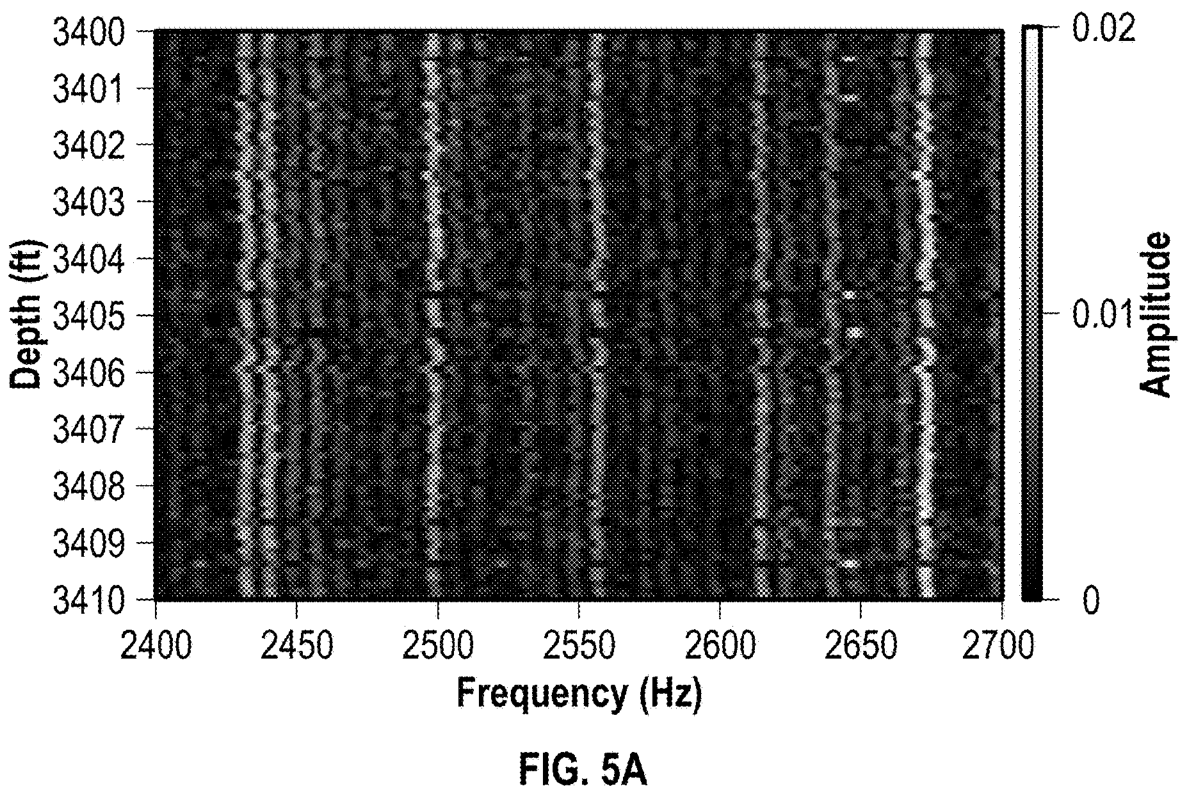
FIG. 5A depicts a portion of the plurality of frequency spectrums of FIG. 4 in accordance with one or more embodiments.
Figure 5B:
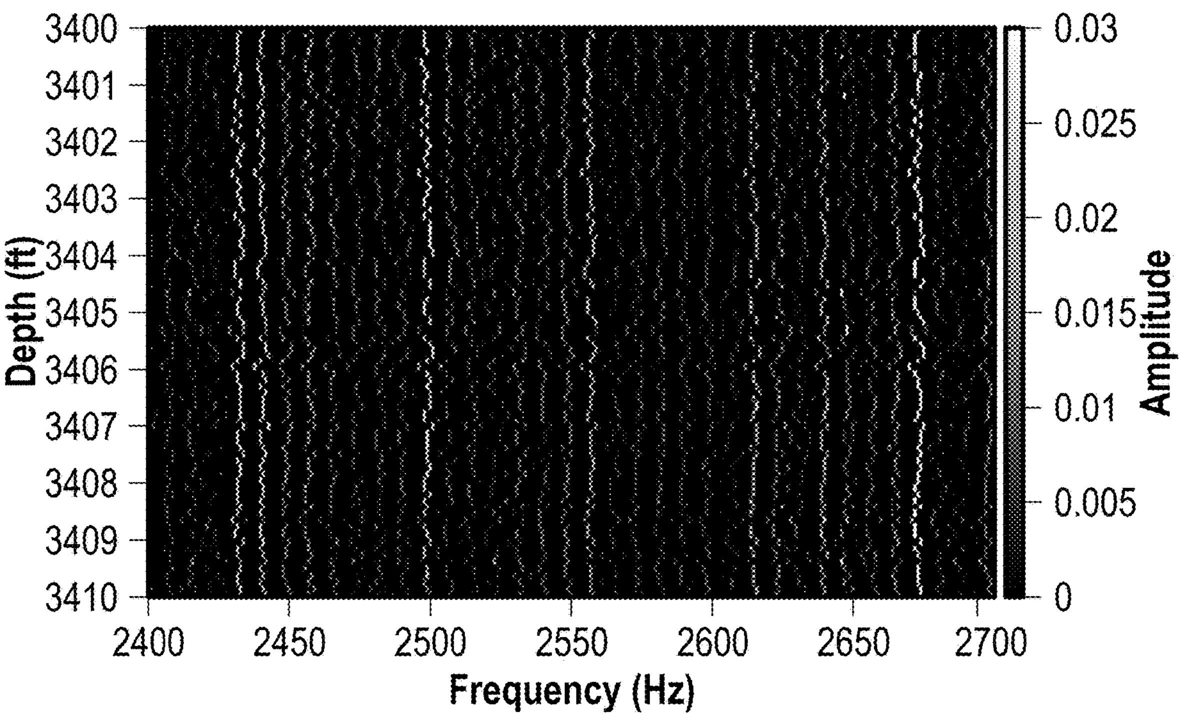
FIG. 5B depicts a portion of a plurality of energy band series, in accordance with one or more embodiments.

To provide an example, FIG. 5A depicts a portion of FIG. 4. The portion of FIG. 4 shown in FIG. 5A is arbitrary. Because FIG. 5A only shows a portion of FIG. 4, the plurality of frequency spectrums is displayed with greater detail. As seen in FIG. 5A, the frequency data points are often distributed around local peaks (clusters). However, due to the aforementioned sources of error, clusters of frequency data points have inconsistent frequency amplitudes and consequently FIG. 5A appears blurry. Further, any signal traces developed using the plurality of frequency spectrums depicted in FIG. 5A will have increased uncertainty with respect to shifts in frequency. FIG. 5B shows the same portion of FIG. 4 as FIG. 5A, but instead depicts the plurality of energy band series obtained by transforming each frequency spectrum of the plurality of frequency spectrums in accordance with the methods of this disclosure. As seen in FIG. 5B, the frequency data points are no longer grouped in local, inconsistent (blurry) clusters. Signal traces developed using the plurality of energy band series depicted in FIG. 5B would have less noise and demonstrate frequency shifts with greater clarity.

By analyzing signal traces, the relative contribution of a plurality of parameters to an acoustic signal (or a plurality of acoustic signals), may be determined. For example, using one or more signal traces developed using an ordered plurality of energy band series determined from a plurality of acoustic signals emanating from a drill bit (116), the relative contributions of lithology and drill bit rotation speed (404) may be determined. In other words, for the use case of drilling a wellbore (102), the plurality of parameters includes lithology and drill bit rotation speed (404).

Figure 6:
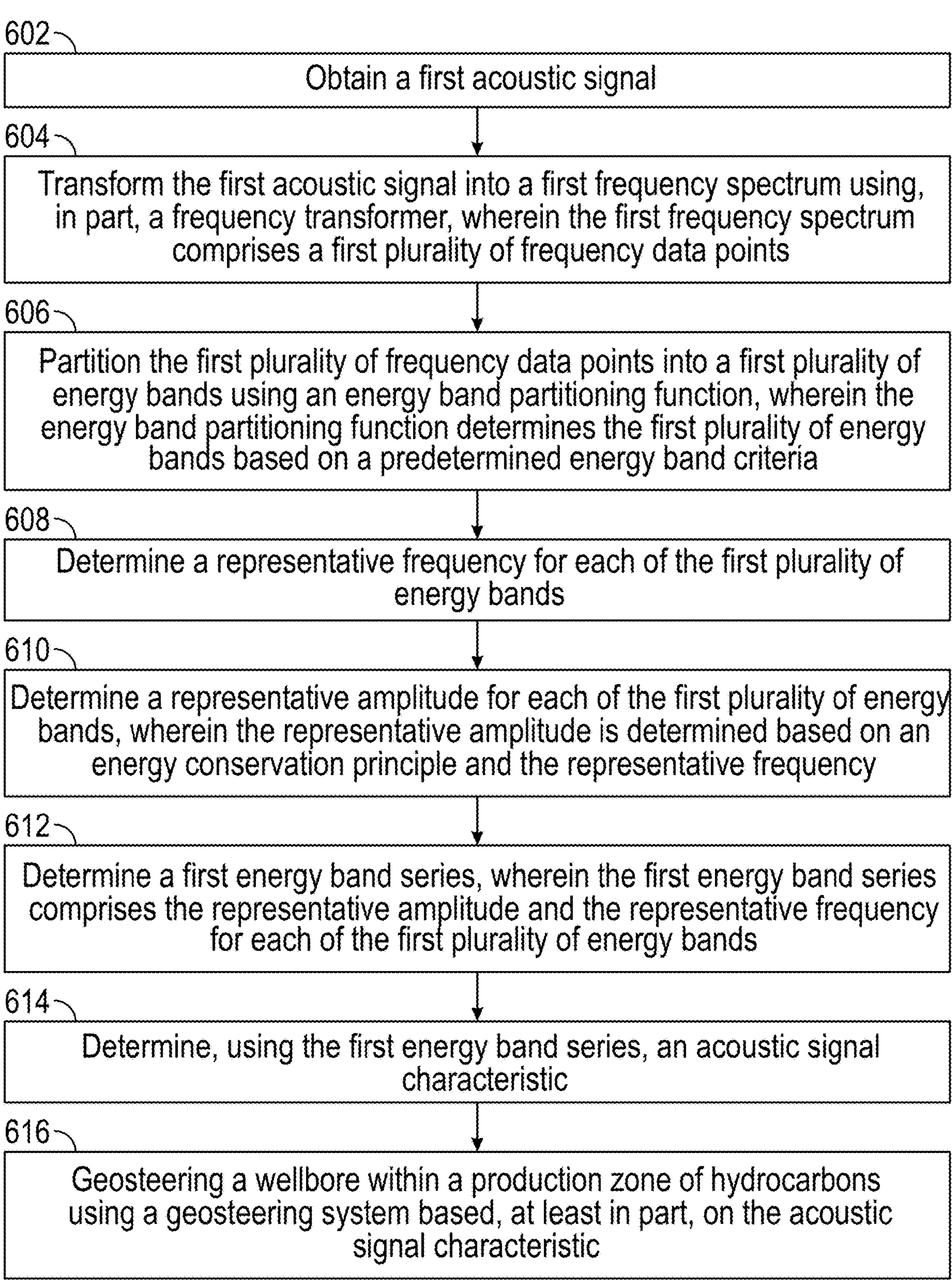
FIG. 6 depicts a flowchart in accordance with one or more embodiments.

FIG. 6 depicts a flowchart outlining the general process of transforming an acoustic signal to an energy band series, in accordance with one or more embodiments. A first acoustic signal is obtained as shown in Block 602. The acoustic signal may be one generated by a drill bit (116) and received and recorded by an acoustic signal recording system (122). In Block 604, the first acoustic signal is transformed to a first frequency spectrum using, in part, a frequency transformer. For example, a Fourier transform, such as a fast Fourier transform may be used. The fast Fourier transform accepts the first acoustic signal as an input and outputs a complex-valued series with respect to a series of discrete frequencies. The frequency amplitude of the complex-valued series may be extracted to produce the first frequency spectrum. The first frequency spectrum consists of a first plurality of frequency data points. Each frequency data point is defined by a frequency and a frequency amplitude. In Block 606, the first plurality of frequency data points is partitioned into a first plurality of energy bands. The partitioning occurs according to an energy band partitioning function. The energy band partitioning function implements a set of rules describing which of the first plurality of frequency data points are to be retained and how the first plurality of frequency data points is distributed over the first plurality of energy bands. In other words, the energy bands are defined by the energy band partitioning function according to a predetermined energy band criterion.

As depicted in Block 608, a representative frequency is determined for each of the first plurality of energy bands. A representative frequency for an energy band is a frequency bounded by its energy band and selected according to a user-defined rule. In some embodiments, the median frequency of the first plurality of frequency data points which have been partitioned into the energy band is selected as the representative frequency for said energy band. With a representative frequency determined for each of the first plurality of energy bands, a representative amplitude is determined for each of the first plurality of energy bands, as shown in Block 610. The representative amplitude is determined using EQ. 4, which enforces a conservation of energy between the frequency data points in an energy band and the resulting representative frequency and representative amplitude. A first energy band series is determined in Block 612. The first energy band series includes the representative frequency and representative amplitude for each of the first plurality of energy bands. In Block 614, the first energy band series is used to determine an acoustic signal characteristic (i.e., a characteristic of the first acoustic signal). For example, in the case where the first acoustic signal was generated by a drill bit (116) while drilling, the first energy band series may be used to determined the lithology of the rock contacted by the drill bit (116) while the first acoustic signal was received and recorded. Finally, as shown in Block 616, using, at least in part, the determined acoustic signal characteristic, a drill bit (116) may be properly steered through a production zone of hydrocarbons in the subsurface of the Earth. This process is known as geosteering the wellbore (102).

Figure 7:
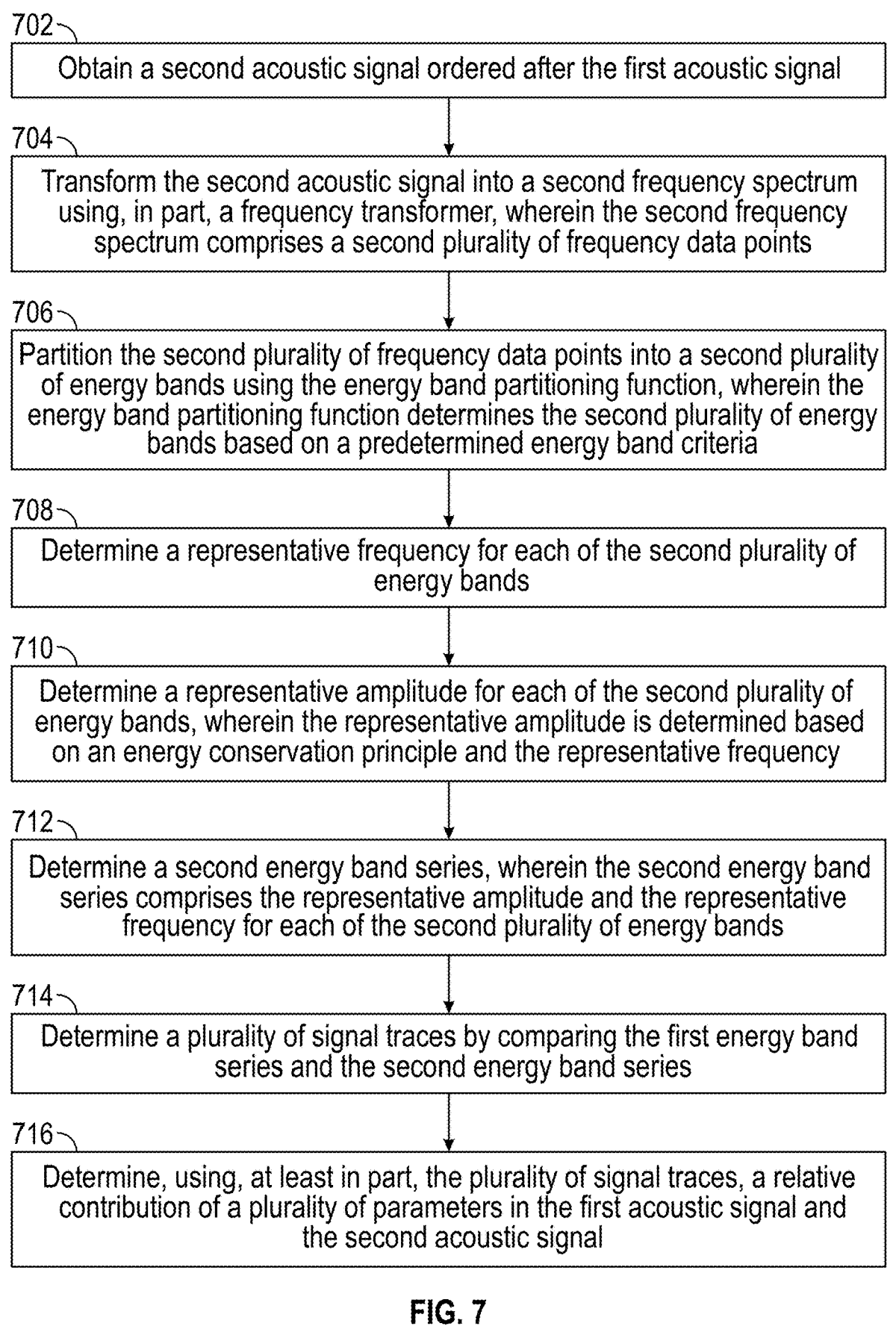

FIG. 7 depicts a flowchart outlining the transformation and use of a second acoustic signal in coordination with the first acoustic signal and processes of FIG. 6, in accordance with one or more embodiments. As shown in Block 702, a second acoustic signal is obtained. The second acoustic signal is ordered relative to the first acoustic signal and is said to be ordered after the first acoustic signal. For example, when the first and second acoustic signals are generated by a drill bit (116) progressing through the subsurface, the first and second acoustic signals will each be associate with a depth. As such, the first and the second acoustic signals may be ordered according to depth where the second acoustic signal is received and recorded at a deeper depth (i.e., the drill bit (116) as progressed further) than the first acoustic signal. In Block 704, the second acoustic signal is transformed to a second frequency spectrum using, in part, a frequency transformer. For example, a Fourier transform, such as a fast Fourier transform, may accept the second acoustic signal as an input and output a complex-valued series with respect to a series of discrete frequencies. The frequency amplitude of the complex-valued series may be extracted to produce the second frequency spectrum. The second frequency spectrum consists of a second plurality of frequency data points. Each frequency data point is defined by a frequency and a frequency amplitude. In Block 706, the second plurality of frequency data points is partitioned into a second plurality of energy bands. The partitioning occurs according to the same energy band partitioning function used with the first plurality of frequency data points. It is noted that the boundaries of the second plurality of energy bands need not be the same as the first plurality of energy bands. In other words, the second plurality of frequency data points may be partitioned distinctly from the first plurality of frequency data points. That is, while the energy band partitioning function applies the same set of rules, or the same energy band criteria, to the first and second pluralities of frequency data points, this process need not yield the same pluralities of energy bands. As depicted in Block 708, a representative frequency is determined for each of the second plurality of energy bands. A representative frequency for each energy band of the second plurality of energy bands is selected according to the same user-defined rule used when selecting representative frequencies for the first plurality of energy bands. When working with more than one acoustic signal, such as the first acoustic signal and the second acoustic signal, the energy band partitioning function and the process of selecting a representative frequency for each energy band must be applied consistently. With a representative frequency determined for each of the second plurality of energy bands, a representative amplitude is determined for each of the second plurality of energy bands, as shown in Block 710. The representative amplitude is determined using EQ. 4, which enforces a conservation of energy between the frequency data points in an energy band and the resulting representative frequency and representative amplitude. A second energy band series is determined in Block 712. The second energy band series includes the representative frequency and representative amplitude for each of the second plurality of energy bands. In Block 714, the first energy band series and the second energy band series are compared to determine a plurality of signal traces. Finally, as shown in Block 716, using, at least in part, the plurality of signal traces, the relative contributions of a plurality of parameters in the first and second acoustic signals may be determined. For example, in the case where the first and second acoustic signals were generated by a drill bit (116) while drilling, the relative contributions of lithology and drill bit rotation speed on the first and second acoustic signals may be determined using, in part, the plurality of signal traces in coordination with information regarding the drill bit rotation speed. In other words, the plurality of parameters may include lithology and drill bit rotation speed.

In accordance with one or more embodiments, a third acoustic signal that is ordered relative to the second acoustic signal and that is said to be ordered after the second acoustic signal may be obtained. In general, any number of ordered acoustic signals may be obtained. That is, in accordance with one or more embodiments, a next new acoustic signal in sequence may be obtained, where the next new acoustic signal is ordered after a previous acoustic signal in sequence.

The ordering of acoustic signals in a sequence may be with respect to depth or another reference such as time. As previously discussed, upon collecting an ordered sequence of acoustic signals (e.g., a plurality of acoustic signals) generated by a drill bit (116) while drilling, each acoustic signal may be converted to a frequency spectrum. The frequency spectrums may be ordered according to the original sequence of acoustic signals. For example, FIG. 4 depicts a plurality of frequency spectrums (402) ordered according to depth (403). Further, each frequency spectrum in a plurality of ordered frequency spectrums may be transformed into an energy band series with the methods disclosed herein. The resulting energy bands series are likewise ordered and may be used to determine signal traces. Signal traces formed using ordered energy band series are improved as noise, error, and uncertainty are reduced, or even removed, from signal traces based on the ordered energy band series.

Again, by analyzing signal traces, the relative contribution of a plurality of parameters to an acoustic signal (or a plurality of acoustic signals), may be determined. For example, using one or more signal traces developed using an ordered plurality of energy band series determined from a plurality of acoustic signals emanating from a drill bit (116), the relative contributions of lithology and drill bit rotation speed (404) may be determined.

Figure 8:
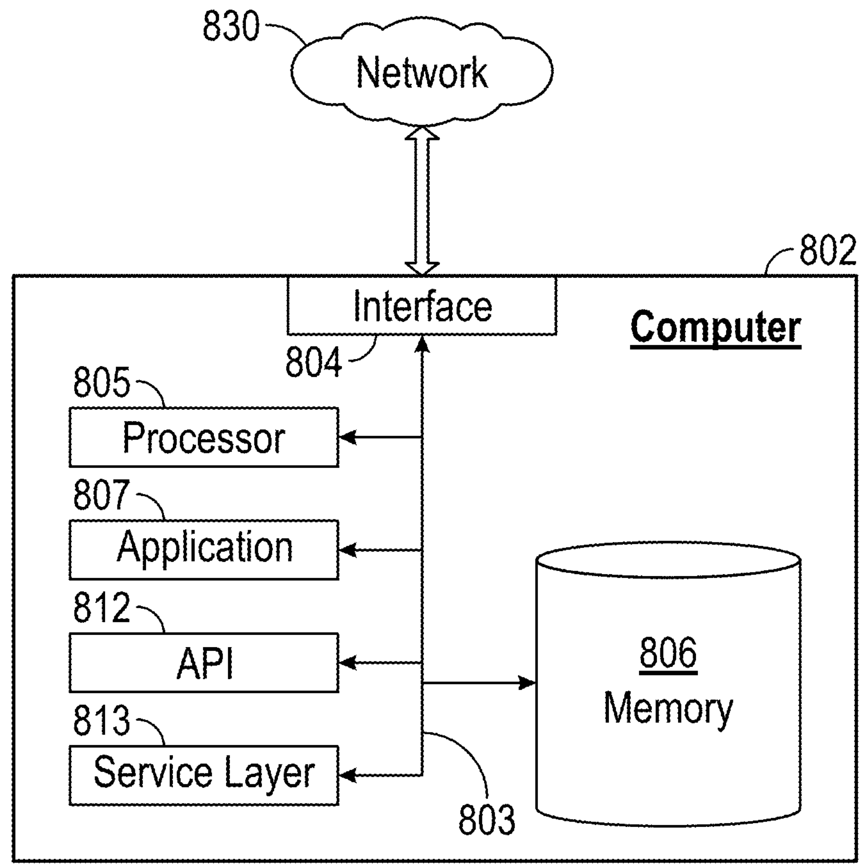
FIG. 8 depicts a system in accordance with one or more embodiments.

FIG. 8 further depicts a block diagram of a computer system (802) used to provide computational functionalities associated with the algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). The memory may be a non-transitory computer readable medium. For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:

obtaining an acoustic signal;

transforming the acoustic signal into a frequency spectrum using a frequency transformer, wherein the frequency spectrum comprises a plurality of frequency data points;

partitioning the plurality of frequency data points into a plurality of energy bands using an energy band partitioning function configured to:

identify a plurality of peak data points in the plurality of frequency data points, wherein each peak data point has a higher amplitude than a respective adjacent frequency data point, select a plurality of selected peak data points from the plurality of peak data points, wherein each selected peak data point has a predetermined minimum number of frequency data points nearby the selected peak data point, and determine the plurality of energy bands, wherein:

each energy band contains a respective selected peak data point and nearby frequency data points based on the predetermined minimum number of frequency data points, adjacent energy bands are separated by a respective lowest frequency data point that has a lower amplitude than a frequency data point adjacent to the respective lowest frequency data point, any frequency data point that has an amplitude of zero is excluded from the plurality of energy bands;

determining a representative frequency for each of the plurality of energy bands;

determining a representative amplitude for each of the plurality of energy bands, wherein the representative amplitude is determined based on an energy conservation principle and the respective representative frequency;

determining an energy band series, wherein the energy band series comprises the representative amplitude and the representative frequency for each of the plurality of energy bands; and determining, using the energy band series, an acoustic signal characteristic.

2. A method of claim 1, further comprising:

obtaining another acoustic signal, wherein the another acoustic signal is ordered after the acoustic signal;

transforming the another acoustic signal into another frequency spectrum using the frequency transformer, wherein the another frequency spectrum comprises another plurality of frequency data points;

partitioning the another plurality of frequency data points into another plurality of energy bands using the energy band partitioning function;

determining a representative frequency for each of the another plurality of energy bands;

determining a representative amplitude for each of the another plurality of energy bands, wherein the representative amplitude is determined based on the energy conservation principle and the respective representative frequency;

determining another energy band series, wherein the another energy band series comprises the representative amplitude and the representative frequency for each of the another plurality of energy bands;

determining a plurality of signal traces by comparing the energy band series and the energy band series; and determining, using the plurality of signal traces, a relative contribution of a set of parameters in the acoustic signal and the another acoustic signal.

3. The method of claim 1, wherein the acoustic signal is a drill bit sound.

4. The method of claim 1, wherein the acoustic signal characteristic indicates a petrophysical property of rock.

5. The method of claim 2, wherein the set of parameters comprises a lithology and a drill bit rotation rate.

6. The method of claim 1, further comprising geosteering a wellbore within a production zone of hydrocarbons using a geosteering system based on the acoustic signal characteristic.

7. The method of claim 1, wherein any frequency data point that is not selected by the energy band partitioning function is omitted from the plurality of energy bands.

8. The method of claim 1, wherein determining the representative frequency for each of the plurality of energy bands comprises selecting a frequency of the peak data point of the respective energy band or a median of frequencies of the respective energy band.

9. A non-transitory computer readable medium, storing instructions executable by a computer processor, the instructions comprising functionality for:

receiving an acoustic signal;

transforming the acoustic signal into a frequency spectrum using a frequency transformer, wherein the frequency spectrum comprises a plurality of frequency data points;

partitioning the plurality of frequency data points into a plurality of energy bands using an energy band partitioning function configured to:

identify a plurality of peak data points in the plurality of frequency data points, wherein each peak data point has a higher amplitude than a respective adjacent frequency data point, select a plurality of selected peak data points from the plurality of peak data points, wherein each selected peak data point has a predetermined minimum number of frequency data points nearby the selected peak data point, and determine the plurality of energy bands, wherein:

each energy band contains a respective selected peak data point and nearby frequency data points based on the predetermined minimum number of frequency data points, adjacent energy bands are separated by a respective lowest frequency data point that has a lower amplitude than a frequency data point adjacent to the respective lowest frequency data point, any frequency data point that has an amplitude of zero is excluded from the plurality of energy bands;

determining a representative frequency for each of the plurality of energy bands;

determining a representative amplitude for each of the plurality of energy bands, wherein the representative amplitude is determined based on an energy conservation principle and the respective representative frequency;

determining an energy band series, wherein the energy band series comprises the representative amplitude and the representative frequency for each of the plurality of energy bands; and determining, using the energy band series, an acoustic signal characteristic.

10. The non-transitory computer readable medium of claim 9, wherein the acoustic signal characteristic indicates a petrophysical property of rock.

11. The non-transitory computer readable medium of claim 9, the instructions further comprising functionality for transmitting a command to a geosteering system to geosteer a wellbore within a production zone of hydrocarbons based on the acoustic signal characteristic.

12. The non-transitory computer readable medium of claim 9, wherein any frequency data point that is not selected by the energy band partitioning function is omitted from the plurality of energy bands.

13. The non-transitory computer readable medium of claim 9, wherein determining the representative frequency for each of the plurality of energy bands comprises selecting a frequency of the peak data point of the respective energy band or a median of frequencies of the respective energy band.

14. A system, comprising:

a drilling system comprising:

a drill bit configured to cut a rock, and an operations system configured to monitor and control drilling operations, the operations system configured to measure and record, at least, a rotation speed of the drill bit and a depth of the drill bit;

an acoustic signal recording system configured to receive and record an acoustic signal; and a computer, comprising one or more computer processors and a non-transitory computer readable medium storing instructions executable by the one or more computer processors, the instructions comprising functionality for:

transforming the acoustic signal into a frequency spectrum using a frequency transformer, wherein the frequency spectrum comprises a plurality of frequency data points;

partitioning the plurality of frequency data points into a plurality of energy bands using an energy band partitioning function configured to:

identify a plurality of peak data points in the plurality of frequency data points, wherein each peak data point has a higher amplitude than a respective adjacent frequency data point, select a plurality of selected peak data points from the plurality of peak data points, wherein each selected peak data point has a predetermined minimum number of frequency data points nearby the selected peak data point, and determine the plurality of energy bands, wherein:

each energy band contains a respective selected peak data point and nearby frequency data points based on the predetermined minimum number of frequency data points, adjacent energy bands are separated by a respective lowest frequency data point that has a lower amplitude than a frequency data point adjacent to the respective lowest frequency data point, any frequency data point that has an amplitude of zero is excluded from the plurality of energy bands;

determining a representative frequency for each of the plurality of energy bands;

determining a representative amplitude for each of the plurality of energy bands, wherein the representative amplitude is determined based on an energy conservation principle and the respective representative frequency;

determining an energy band series, wherein the energy band series comprises the representative amplitude and the representative frequency for each for each of the plurality of energy bands; and determining, using the energy band series, an acoustic signal characteristic.

15. The system of claim 14, wherein the acoustic signal characteristic indicates a petrophysical property of rock.

16. The system of claim 14, wherein the drilling system is configured to geosteer a wellbore within a production zone of hydrocarbons using a geosteering system based on the acoustic signal characteristic.

17. The system of claim 14, wherein determining the representative frequency for each of the plurality of energy bands comprises selecting a frequency of the peak data point of the respective energy band or a median of frequencies of the respective energy band.

* * * * *